US012753902B2

(12) United States Patent
Laurençot et al.

(10) Patent No.: US 12,753,902 B2
(45) Date of Patent: Oct. 6, 2026

(54) BUMPER GRILLE LIGHTING DEVICE

(71) Applicant: Flex-N-Gate France, Audincourt (FR)

(72) Inventors: David Laurençot, Raynans (FR); Yohan Garnier, Nommay (FR)

(73) Assignee: FLEX-N-GATE FRANCE, Audincourt (FR)

( * ) Notice: Subject to any disclaimer, the term of this patent is extended or adjusted under 35 U.S.C. 154(b) by 0 days.

(21) Appl. No.: 19/306,717

(22) Filed: Aug. 21, 2025

(65) Prior Publication Data

US 2026/0055872 A1 Feb. 26, 2026

(30) Foreign Application Priority Data

Aug. 26, 2024 (FR) ..................................... 24 09112

(51) Int. Cl.
*F21S 41/30* (2018.01)
*F21S 41/20* (2018.01)
(Continued)

(52) U.S. Cl.
CPC ............. *F21S 45/10* (2018.01); *F21S 41/285* (2018.01); *F21S 41/30* (2018.01); *F21V 15/01* (2013.01)

(58) Field of Classification Search
CPC .......... F21S 41/285; F21S 45/10; F21S 41/30; F21S 43/245; F21S 41/24; F21S 41/50; F21S 43/239; F21S 41/148; F21V 15/01; G02B 6/0011; G02B 6/0038; G02B 6/004; G02B 6/0043; G02B 6/0041; G02B 6/0045; G02B 6/0046; G02B 6/0048; B60Q 1/0035; B60Q 1/56; B60Q 1/28; B60Q 1/30; B60Q 1/32; B60Q 1/46; B60Q 2400/30; B60R 19/52; B60R 2019/525;
(Continued)

(56) References Cited

U.S. PATENT DOCUMENTS

2021/0362648 A1 11/2021 Lee

FOREIGN PATENT DOCUMENTS

CN 204279217 U 4/2015
FR 2403388 A1 4/1979
(Continued)

OTHER PUBLICATIONS

Searh English translation of JP 2004311162 A (Year: 2004).*
Search English translation of JP 2020059445 A (Year: 2020).*
French Search Report for FR2409112 dated Jan. 10, 2025, 2 pages.

*Primary Examiner* — Omar Rojas Cadima

(74) *Attorney, Agent, or Firm* — NIXON & VANDERHYE

(57) ABSTRACT

The invention relates to a lighting device (20) for a grille (16) of a bumper, extending between an upper end (22) and a lower end (24) and comprising a rear housing (26) and a front wall (28) defining an internal space (40);

the lighting device further comprising a printed circuit board (30), a light source (32), and a diffusion plate (34), received in the internal space; the printed circuit board (30) and the light source (32) being positioned at the upper end (22) of the lighting device;

the lighting device being configured so that: a first distance (42) separates the rear housing and the front wall at the upper end (22); and a second distance (44) separates the rear housing and the front wall at the lower end (24); the second distance being less than the first distance.

7 Claims, 3 Drawing Sheets

(51) Int. Cl.
*F21S 45/10* (2018.01)
*F21V 15/01* (2006.01)

(58) Field of Classification Search
CPC . B60R 13/10; F21W 2103/55; F21Y 2115/10; F21Y 2107/90
See application file for complete search history.

(56) References Cited

FOREIGN PATENT DOCUMENTS

| | | | | | |
|---|---|---|---|---|---|
| JP | 2004311162 | A | * | 11/2004 | |
| JP | 2020059445 | A | * | 4/2020 | .............. F21S 45/10 |
| WO | 2022199727 | A1 | | 9/2022 | |

* cited by examiner

BUMPER GRILLE LIGHTING DEVICE

This application claims priority to FR 24 09112 filed Aug. 26, 2024, the entire contents of which are hereby incorporated by reference.

The present invention relates to a bumper grille lighting device, extending between an upper end and a lower end and comprising: a rear housing; and a front wall, assembled to the rear housing, said rear housing and said front wall defining an internal space; the front wall being transparent or translucent; the lighting device further comprising: a printed circuit board; a light source, fixed to the printed circuit board; and a diffusion plate, with an upper edge of said diffusion plate being positioned opposite the light source; the printed circuit board, the light source, and the diffusion plate being received in the internal space; the printed circuit board and the light source being positioned at the upper end of the lighting device; the diffusion plate being positioned substantially opposite the front wall and extending substantially between the upper end and the lower end of the lighting device.

Making vehicle bumper grilles with an integrated lighting device is known. Such a lighting device plays an aesthetic role and allows the vehicle brand to be identified both day and night.

However, in the event of a frontal impact suffered by the front bumper of the vehicle, damage may be inflicted on the lighting device by the very structure of the vehicle.

To limit this damage, equipping the bumper with an impact absorption device is known, as described in application FR2403388, not yet published, in the Applicant's name.

The present invention aims to propose a lighting device configured to minimize damage in the event of a frontal impact.

To this end, the invention relates to a lighting device of the aforementioned type, configured so that: a first distance separates the rear housing and the front wall at the upper end; and a second distance separates the rear housing and the front wall at the lower end; the second distance being less than the first distance.

According to other advantageous aspects of the invention, the lighting device includes one or more of the following features, taken individually or in any technically possible combination:

- the rear housing includes at least one shoulder intended to be positioned substantially horizontally, so that the rear housing is closer to the front wall below said shoulder than above said shoulder;
- the rear housing includes at least one inclined portion intended to be positioned inclined with respect to the vertical, so that the rear housing is closer to the front wall below said inclined portion than above said inclined portion;
- a third distance separates the rear housing and the diffusion plate at the upper end; and a fourth distance separates the rear housing and the diffusion plate at the lower end; the fourth distance being less than the third distance;
- a rear face of the diffusion plate includes one or more grooves;
- the lighting device further comprises a reflection plate, the diffusion plate being positioned between the front wall and the reflection plate;
- the lighting device further comprises a masking strip located at the upper end, said masking strip being positioned between the front wall and the printed circuit board.

The invention also relates to a vehicle comprising: a bumper grille; and a front crossbeam, located behind said grille; the grille comprising a lighting device as described above, the upper end of said lighting device being positioned higher than the front crossbeam.

According to an advantageous aspect of the invention, the lower end of the lighting device is positioned substantially at the same level as the front crossbeam according to the vertical.

The invention will become clearer upon reading the following description, given solely by way of non-limiting example, and made with reference to the drawings wherein.

Figure 1:
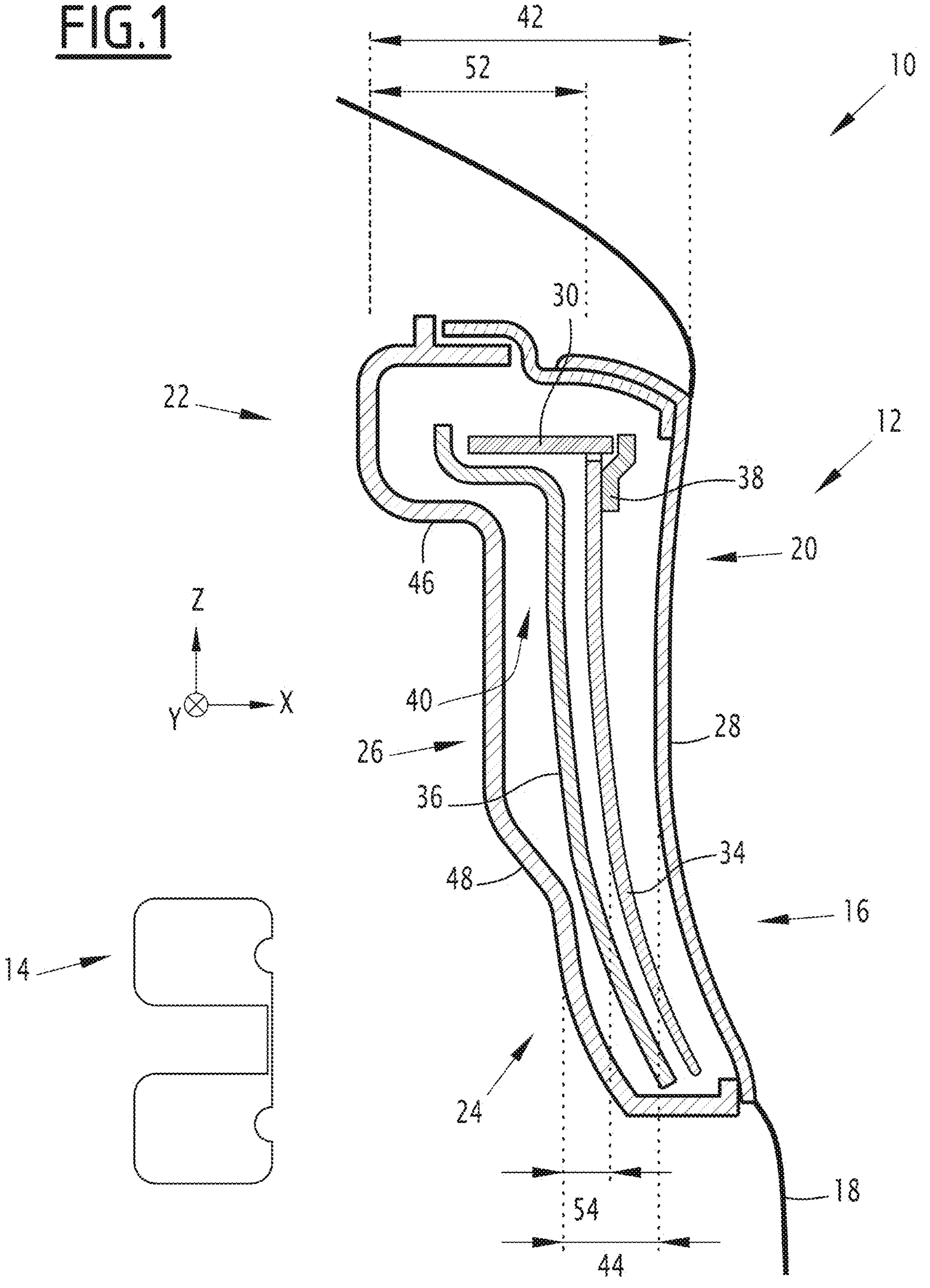
FIG. 1 is a partial schematic sectional view of a vehicle according to an embodiment of the invention, in a first configuration.
Figure 2:
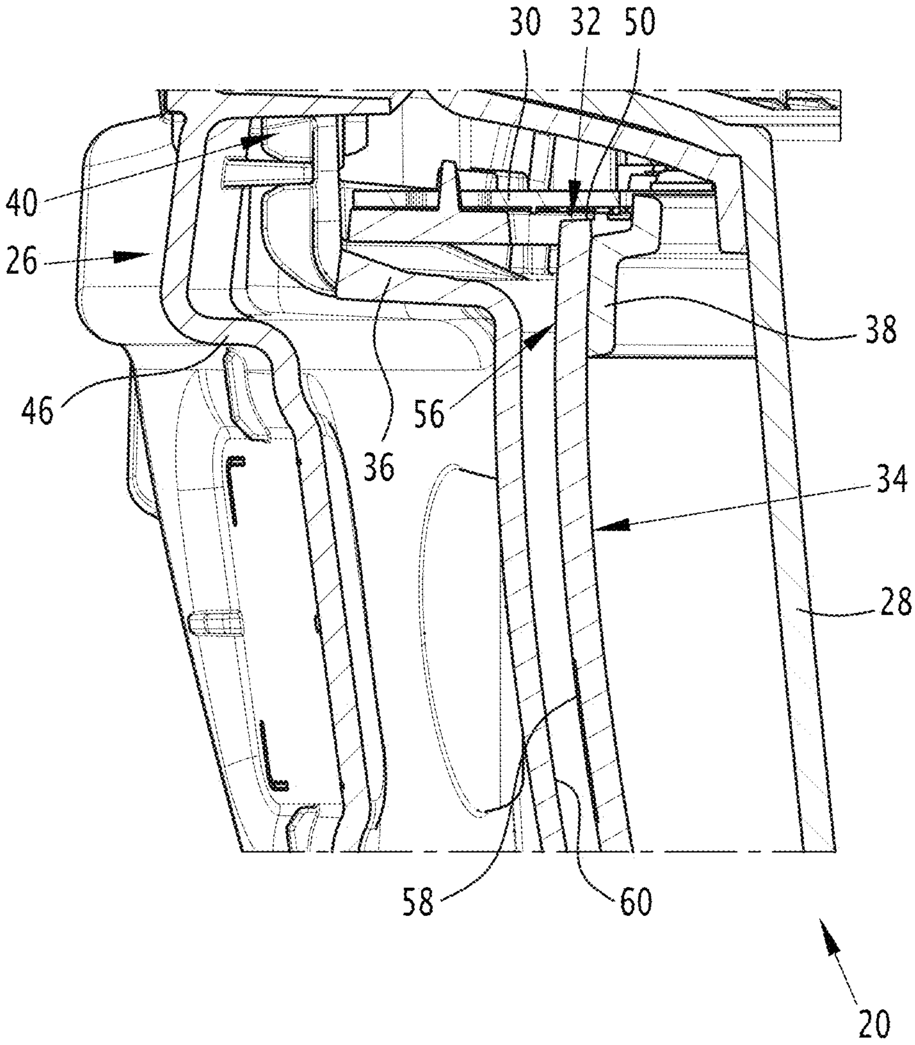
FIG. 2 is a detailed view of the vehicle of FIG. 1.
Figure 3:
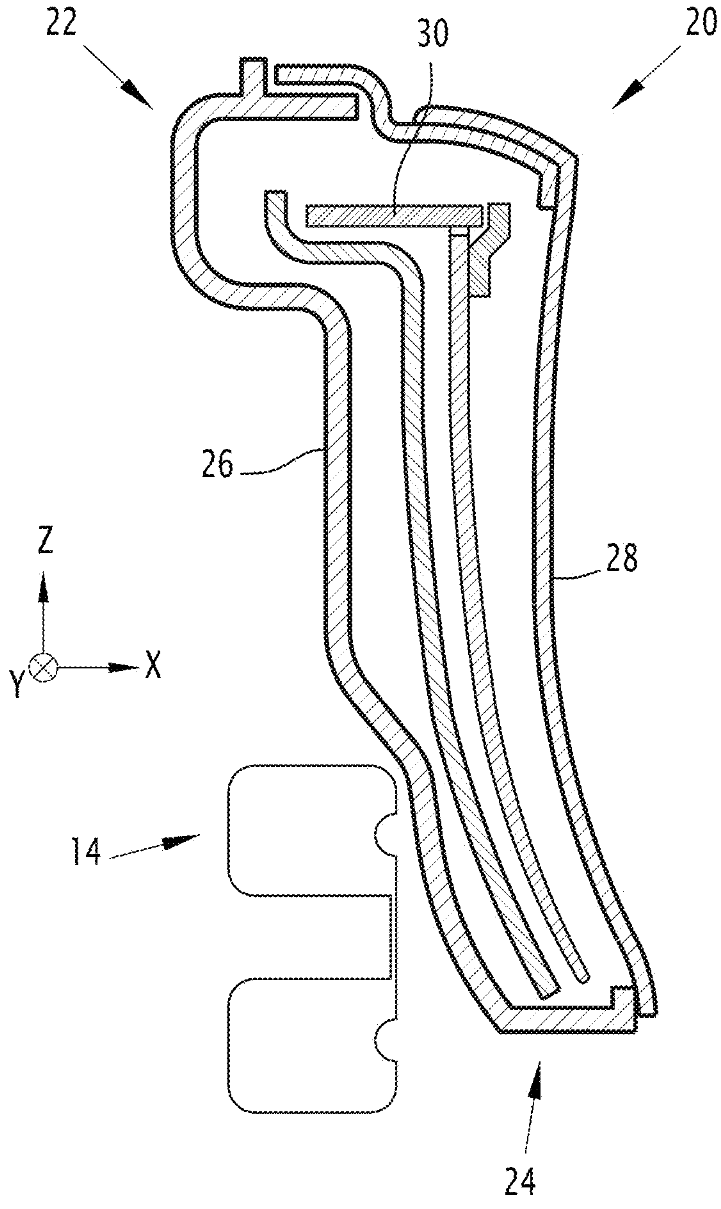
FIG. 3 is a partial schematic sectional view of a vehicle partial schematic sectional view of the vehicle of FIGS. 1 and 2, in a second configuration.

FIGS. 1 to 3 represent a vehicle 10, according to one embodiment of the invention. Only the front of the vehicle 10 is visible. The term "front" is understood in relation to a horizontal direction of movement of the vehicle 10.

An orthonormal base (X, Y, Z) is considered associated with the vehicle 10. The X direction is the direction of movement of the vehicle, the Z direction representing the vertical.

The vehicle 10 comprises a front bumper 12. The bumper 12 comprises a front crossbeam 14 and a grille 16.

The front crossbeam 14 extends in the Y direction. The grille 16 is positioned in front of the front crossbeam 14 and forms a front end of the vehicle 10.

The grille 16 comprises a skin 18 and a lighting device 20, integral with each other. More precisely, the skin 18 and the lighting device 20 form a substantially continuous external surface, visible from outside the vehicle.

The lighting device 20 extends between an upper end 22 and a lower end 24 in the Z direction. The upper end 22 is located higher in Z than the front crossbeam 14. Preferably, as in the represented embodiment, said front crossbeam 14 is substantially at the level of said lower end 24 in the Z direction.

The lighting device 20 comprises: a rear housing 26; a front wall 28; a printed circuit board 30; a light source 32; a diffusion plate 34; a reflection plate 36; and a masking strip 38.

The rear housing 26 and the front wall 28 are assembled to each other, so as to define an internal space 40. The front wall 28 is transparent or translucent and oriented towards the outside of the vehicle 10.

A dimension in the X direction of the lighting device 20 is higher at the upper end 22 than at the lower end 24.

More precisely, a first distance 42 separates the rear housing 26 and the front wall 28 at the upper end 22; and a second distance 44 separates the rear housing and the front wall at the lower end 24; the second distance 44 being less than the first distance 42.

Preferably, the front wall 28 is positioned substantially vertically and has a substantially constant thickness between the upper end 22 and the lower end 24 of the lighting device 20.

Preferably, the rear housing 26 includes one or more shoulders 46 and/or one or more inclined portions 48 with respect to the vertical, so that the distance between the rear housing 26 and the front wall 28 decreases progressively between the upper end 22 and the lower end 24.

In the represented embodiment, the rear housing 26 includes a substantially horizontal shoulder 46, positioned near the upper end 22. The rear housing 26 is closer to the front wall 28 below said shoulder 46 than above said shoulder.

Furthermore, in the represented embodiment, the rear housing 26 includes an inclined portion 48, positioned near the lower end 24. The rear housing 26 is closer to the front wall 28 below said inclined portion 48 than above said inclined portion.

In the represented embodiment, the front crossbeam 14 is located lower in Z than the inclined portion 48.

The printed circuit board 30, the light source 32, and the diffusion plate 34 are received in the internal space 40.

The printed circuit board 30 is positioned substantially in a horizontal plane and has a substantially rectangular shape. Preferably, a length of the printed circuit board 30 extends in the Y direction and a width of said printed circuit board extends in the X direction.

The light source 32 is integral with a lower face of the printed circuit board 30. Preferably, the light source 32 is formed of a plurality of light-emitting diodes (LEDs) aligned along the printed circuit board 30, substantially in the Y direction.

The printed circuit board 30 and the light source 32 are positioned near the upper end 22 of the lighting device 20. Preferably, the printed circuit board 30 and the light source 32 are positioned above the shoulder 46 of the rear housing 26. In particular, the first distance 42 between the rear housing 26 and the front wall 28 is adapted to accommodate the printed circuit board 30 in the internal space 40, at the level of the upper end 22.

The diffusion plate 34 is positioned substantially opposite the front wall 28 and extends substantially between the upper end 22 and the lower end 24 of the lighting device 20. Preferably, the diffusion plate 34 is positioned substantially vertically.

The diffusion plate 34 extends from an upper edge 50, positioned substantially horizontally. The upper edge 50 is located opposite the light source 32. Preferably, the upper edge 50 is elongated in the Y direction and is opposite the plurality of LEDs aligned along the printed circuit board 30.

Preferably, a third distance 52 separates the rear housing 26 and the diffusion plate 34 at the upper end 22; and a fourth distance 54 separates the rear housing and the diffusion plate at the lower end 24, the fourth distance 54 being less than the third distance 52.

According to one embodiment, a rear face 56 of the diffusion plate 34 includes one or more grooves 58, as visible in FIG. 2. In the represented embodiment, the grooves 58 are substantially vertical and distributed along the Y direction.

Preferably, the grooves 58 have a shape allowing light diffraction, as described below. For example, the grooves 58 are formed of micro-cones.

The reflection plate 36 is received in the internal space 40. The diffusion plate 34 is positioned between the front wall 28 and the reflection plate 36 in the X direction.

The reflection plate 36 includes a reflective surface 60, oriented towards the diffusion plate 34.

Preferably, at the level of the grooves 58, a distance between the reflective surface 60 and the rear face 56 of the diffusion plate 34 is substantially constant in the Z direction.

The masking strip 38 is received in the internal space 40 and located at the upper end 22 of the lighting device 20.

The masking strip 38 extends substantially vertically and preferably has an elongated shape in the Y direction. This masking strip 38 is positioned between the front wall 28 and the printed circuit board 30 in the X direction.

Preferably, the masking strip 38 is also positioned between the front wall 28 and the upper edge 50 of the diffusion plate 34, in the X direction. Preferably, the masking strip 38 is located higher than the grooves 58 of the diffusion plate 34.

Thus, for an observer located outside the vehicle 10, the printed circuit board 30 and the upper edge 50 of the diffusion plate 34 are concealed by the masking strip 38. However, the grooves 58 are not concealed by said masking strip.

A method of operation of the lighting device 20 will now be described. When the light source 32 is in operation, the emitted light is diffused in the diffusion plate 34 from the upper edge 50. This light is diffracted at the grooves 58 and visible from outside the vehicle 10, through the front wall 28. This light is also reflected on the reflective surface 60 of the reflection plate 36, giving a depth effect to the light pattern.

FIG. 1 shows the vehicle 10 in a first configuration, or initial configuration. In the event of a frontal impact at the front bumper 12 of the vehicle 10, the grille 16 is deformed and approaches the front crossbeam 14 in the X direction. FIG. 3 shows the vehicle 10 in a second configuration, or configuration after frontal impact.

In the second configuration, the front crossbeam 14 is located near the lower end 24 of the lighting device 20, preferably lower than the inclined portion 48. However, the printed circuit board 30 and the light source 32 are located above said front crossbeam 14 and are therefore not damaged by said crossbeam during the impact.

Furthermore, the lower end 24 of the lighting device 20 has a low thickness, corresponding to the second distance 44. It is therefore possible that the retreat of the grille 16 during the impact is sufficiently small for the lighting device 20 not to come into contact with the front crossbeam 14.

The configuration of the lighting device 20 according to the invention therefore minimizes the damage to said lighting device in the event of a frontal impact suffered by the vehicle 10.

The invention claimed is:

1. A lighting device for a bumper grille, the lighting device extending between an upper end and a lower end along a vertical direction, the lighting device comprising:
- a rear housing;
- a front wall assembled to the rear housing, the front wall being transparent or translucent, said rear housing and said front wall defining an internal space;
- a printed circuit board;
- a light source fixed to the printed circuit board;
- a diffusion plate including
  - an upper edge disposed opposite the light source, the upper edge being elongated in a horizontal direction, and
  - a rear face including substantially vertical grooves distributed along the horizontal direction, the substantially vertical grooves having a shape configured to allow light diffraction; and
- a reflection plate disposed in the internal space, the diffusion plate being disposed between the front wall and the reflection plate, the reflection plate including a reflective surface oriented towards the diffusion plate, at a level of the substantially vertical grooves, a distance between the reflective surface and the rear face of the diffusion plate being substantially constant in the vertical direction, wherein the printed circuit board, the light source, and the diffusion plate are received in the internal space, the printed circuit board and the light source being disposed at the upper end of the lighting device, the diffusion plate being disposed substantially opposite the front wall and extending substantially between the upper end and the lower end of the lighting device, and wherein the lighting device is configured so that: a first distance separates the rear housing and the front wall at the upper end, and a second distance separates the rear housing and the front wall at the lower end, the second distance being less than the first distance.

2. The lighting device according to claim 1, wherein the rear housing includes at least one shoulder disposed substantially horizontally, so that the rear housing is closer to the front wall below said shoulder than above said shoulder.

3. The lighting device according to claim 1, wherein the rear housing includes at least one inclined portion inclined with respect to the vertical, so that the rear housing is closer to the front wall below said inclined portion than above said inclined portion.

4. The lighting device according to claim 1, wherein a third distance separates the rear housing and the diffusion plate at the upper end, and a fourth distance separates the rear housing and the diffusion plate at the lower end, the fourth distance being less than the third distance.

5. The lighting device according to claim 1, further comprising a masking strip disposed at the upper end, said masking strip being disposed between the front wall and the printed circuit board.

6. A vehicle comprising:

a bumper grille comprising the lighting device according to claim 1; and a front crossbeam disposed behind the bumper grille, the upper end of said lighting device being disposed higher than the front crossbeam.

7. The vehicle according to claim 6, wherein the lower end of the lighting device is disposed substantially at a same level as the front crossbeam according to a vertical plane.

* * * * *